United States Patent [19]

Donakowski et al.

[11] 4,018,949

[45] Apr. 19, 1977

[54] SELECTIVE TIN DEPOSITION ONTO ALUMINUM PISTON SKIRT AREAS

[75] Inventors: William A. Donakowski; John R. Morgan, both of Dearborn Heights, Mich.

[73] Assignee: Ford Motor Company, Dearborn, Mich.

[22] Filed: Jan. 12, 1976

[21] Appl. No.: 648,341

[52] U.S. Cl. .............................. 427/327; 427/420; 427/427; 148/6.27; 123/193 P
[51] Int. Cl.² .......................................... C23F 7/00
[58] Field of Search .......... 427/420, 421, 427, 436, 427/327; 123/193 P; 148/6.27; 118/DIG. 11

[56] References Cited

UNITED STATES PATENTS

| | | | |
|---|---|---|---|
| 1,346,638 | 7/1920 | Crook et al. | 427/427 |
| 2,377,606 | 6/1945 | Blackman et al. | 427/436 |
| 2,947,639 | 8/1960 | Balden | 427/436 |
| 2,955,886 | 10/1960 | Fritzlen et al. | 427/427 |
| 3,113,051 | 12/1963 | Pimbley et al. | 148/6.27 |

Primary Examiner—Ralph S. Kendall
Assistant Examiner—Charles R. Wolfe, Jr.
Attorney, Agent, or Firm—Joseph W. Malleck; Keith L. Zerschling

[57] ABSTRACT

A cost saving method for protecting an engine element against operation galling and corrosion is disclosed. The element, particularly a piston, is cast of aluminum and cleaned free of dirt and organic matter. A warm stream of an aqueous solution containing a protective metal agent is directed onto a selected zone of the element. The agent consists essentially of potassium stannate and the zone is preferably the middle region of a piston skirt extending from the upper skirt periphery to lower skirt extremity (tail). The stream is maintained as a laminar flow as it traverses the selected zone. An ultra-thin protective coating is adherently deposited on the zone of the piston.

5 Claims, 4 Drawing Figures

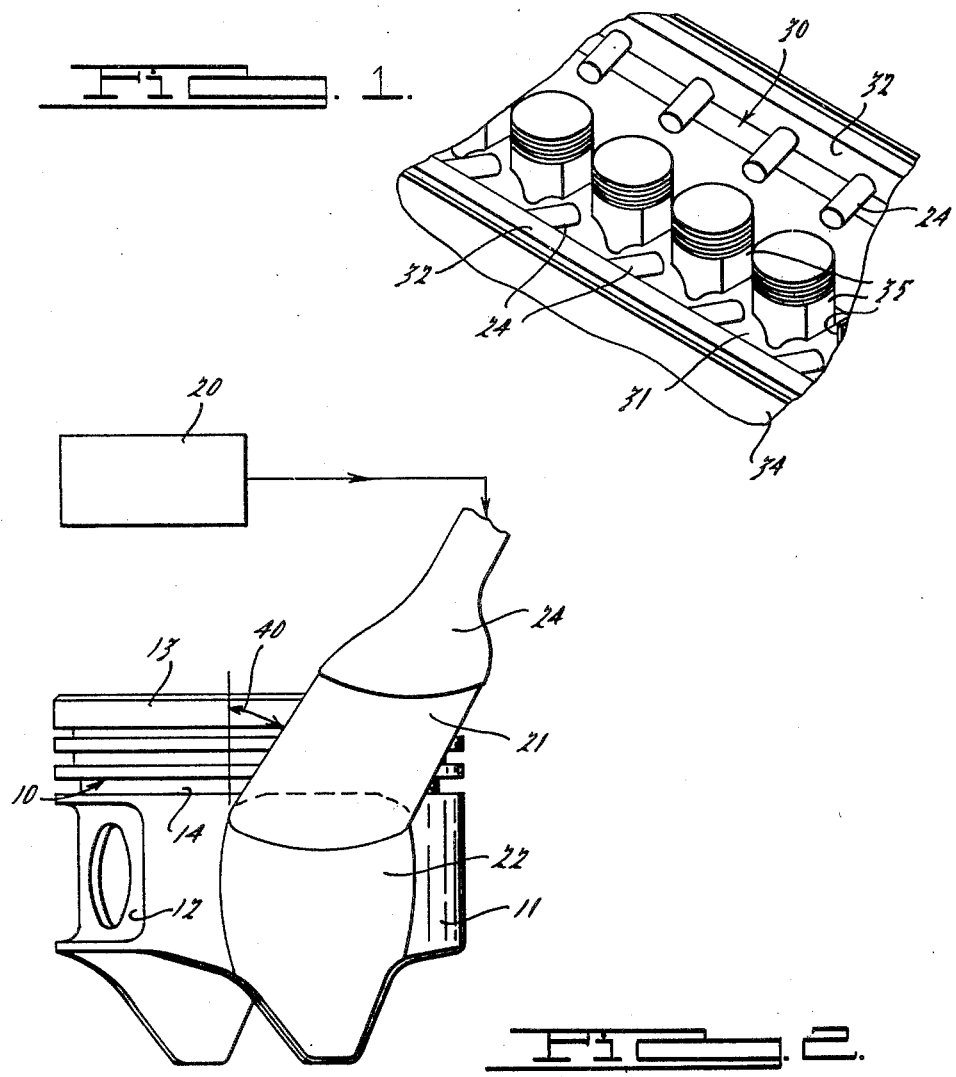
FIG. 1.
FIG. 2.
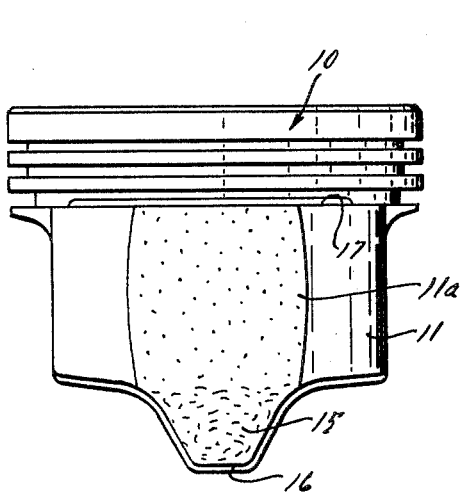
FIG. 3.
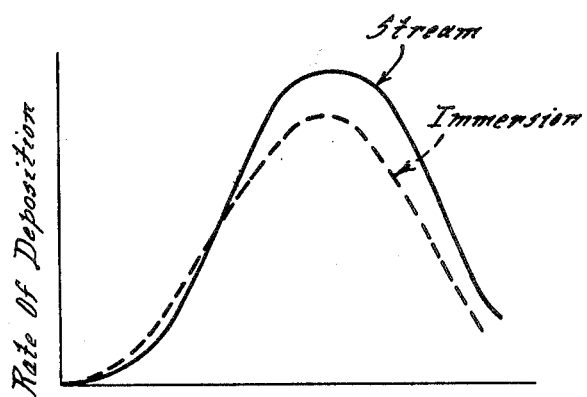
FIG. 4.

SELECTIVE TIN DEPOSITION ONTO ALUMINUM PISTON SKIRT AREAS

BACKGROUND OF THE INVENTION

Use of aluminum to save weight in internal combustion engines has now become an accepted solution and a concentrated area of development. Other lightweight materials will also become of importance and will require similar development. However, there are noticeable problems to be overcome by the engine designer when incorporating these materials into parts of the engine subjected to both wear and a severe corrosive atmosphere. It had been hoped that by the introduction of aluminum alloys containing high silicon, resistance to wear would be overcome. But in certain applications, wear surfaces experience periods where normal engine lubrication is at a minimum and, in fact, the oil film may be washed off of such wear surfaces during the cold-start engine condition. Accordingly, at these areas, particularly where the skirt of a piston meets with the bore surface, the material is not able to cope with such condition without wearing excessively.

A variety of solutions have been undertaken by the prior art to remedy this, one of which is to apply a variety of coatings to the aluminum substrate, among which include zinc, copper, hard iron, or an electroplated tin second coating. The obvious disadvantages of these coatings are their expense and low rate of productivity. Another approach has been to immerse the aluminum parts in an aqueous solution of tin or lead, the tin or lead coating all or a major portion of the part that has been so immersed. The unfortunate result of this technique is that the portion of the part so coated is far in excess of the local area or zone requiring such treatment and thus is expensive and wasteful.

SUMMARY OF THE INVENTION

The primary object of this invention is to provide an improved method of protecting an element of an internal combustion engine against galling and corrosion at selected zones thereof.

Another object of this invention is to provide a method of protecting the skirts of an aluminum piston against a variety of wear problems, principally siezing, scuffing and pitting, when such piston is operated in an engine housing constructed primarily of iron.

Yet still another object of this invention is to provide a method of allowing lighter weight materials to be employed in critical wear applications of an internal combustion engine, said materials being lower in hardenability than other equivalent ferrous elements, the method providing for a protective coating which enables said part to have an equivalent hardenability to conventional but heavier materials.

Another object of this invention is to provide a method for protecting a selected zone of an engine part subjected to both wear and severe corrosive atmosphere, said method providing said protection at a reduced cost compared to equivalent methods.

Another object of this invention is to provide a method of protecting selected zones of critical wear part of an internal combustion engine, said method enabling said protection to be carried out at increased production rates.

Yet still another object of this invention is to provide an aluminum piston construction having protected surfaces normally subjected to sliding wear and a corrosive atmosphere condition, said piston being characterized by the presence of a limited quantity of tin applied along at a predetermined lateral arc of the piston skirt and extending from the uppermost to the lowermost region of said skirt.

Features pursuant to the method objects of this invention comprise the use of a stream of an aqueous solution containing the protective metal drawn out upon contact with the part to be coated, said stream is defined and controlled to flow across said selected zone in a manner to provide sufficient time for controlled coating of the protective metal, and the use of tin as the specific and preferred protective metal which is derived from an aqueous solution of potassium stannate, the solution being maintained at a temperature in excess of 120° F.

SUMMARY OF THE DRAWINGS

FIG. 1 is a schematic perspective view of a production line application employing the method of this invention.

FIGS. 2 and 3 are enlarged elevational drawings respectively showing a piston being coated and showing the selected zone of a coated piston according to this invention.

FIG. 4 is a graphical illustration of the rate of coating deposition with time.

DETAILED DESCRIPTION

A preferred method for carrying out the present invention is as follows:

1. Aluminum Substrate: Prepare an aluminum casting or other casting having an equivalent lightweight metal substrate. This invention is particularly concerned with promoting the use of sand cast aluminum pistons to be used in conjunction with a ferrous based cylinder block. The aluminum piston 10 or equivalent metal substrate will have certain exposed surfaces 11 with at least one selected zone 11a to be protected, such zone extending to the lower extremity 16 of the substrate or skirt. With reference to the figures, such exposed surface 11 will typically comprise the aluminum skirt which connects opposite side walls 12, which in turn depend at 14 from a piston head 13. The piston skirts have a tail 15 at the central lower portion thereof which extends to zone 11a; the zone will have considerable height taken from the top of the skirt 17 to the bottom extremity 16 of the tail. It is this particular zone (shaded in FIG. 3) which receives considerable wear during reciprocal motion of the aluminum piston within the cylinder block; the the zonal surfaces tend to maintain the general concentricity of the piston within the cylinder bore.

2. Cleaning: At least said selected zone of exposed surface is cleansed, preferably the entire piston, by subjection to a cleaning solution. To this end, a conveyor moves a series of said pistons into and out of an immersion cleansing solution. Such cleaning solution should preferably be of an alkaline type and serve as a deoxidant. A typical chemical composition for such alkaline cleaner is as follows: total alkalinity as $Na_2O$ 16.5%, phosphates as $P_2O_5$ 7.5% minimum, borates as $B_2O_3$ 28.5% minimum, carbonates as $CO_2$ 5% maximum, and surfactants and wetting agents 5% minimum. An alternative alkaline cleansing solution which will prevent rust and not show salting upon parts standing after cleaning. Such a solution will comprise about 12% minimum total alkalinity as $Na_2O$, 18–20% phosphate as $P_2O_5$, 8% minimum borates as $B_2O_3$, 7% maximum carbonates as $CO_2$, 4.5% minimum surfactants and wetting agents and the presence of a chelating agent.

Irrespective of the particular type of cleansing solution utilized, the cleaner must be capable of freeing the selected zone surface of dirt and organic matter as well as aluminum oxide. The cleanser may have an etching function; a simple material for this purpose can be tri-sodium phosphate carried out at 180° F.

3. Tin Plating: A tin plating immersion is prepared and may typically comprise an aqueous solution of potassium stannate ($K_2SnO_3 \cdot 8 H_2O$). Potassium stannate should be 31–38% by weight of the chemical compound and have a 2.5% minimum of sodium gluconate or 12–16% sodium tri-polyphosphate, either of the latter acting as a sequestering agent. The solution may have 1% maximum free alkali as potassium hydroxide. The moisture content of such tin plating compound should be no greater than 3.5% when sodium gluconate is utilized or 2.5% maximum when sodium tri-polyphosphate is utilized.

4. Stream Plating: The tin plating solution 20 is warmed and forced into a stream 21 directed onto each selected zone 11a of the piston skirts, the stream being particularly directed to contact near the upper extremity 17 of the zone and follow along the surface 11 as a laminar flow 22 to the lower extremity 16 where the flow leaves the surface. It is preferable that a spread nozzle 24 be employed to lay down a flat stream layer 21 which is commensurate in width to the width of a zone to be coated. The stream should be maintained at a temperature between 130°–150° F. It is important that the angle of incidence 40 of the stream as directed upon the selected zone be within the angular range of 5–40° taken with respect to the plane of the zone. During such intimate contact with the cleaned aluminum zone 11, the aluminum will be coated with a uniform thickness of tin in the preferable thickness range of 35–65 millionths of an inch (however the operable range can be 10–150 millionths of an inch), and most typically the thickness will be about 50 millionths of an inch, assuming the stream is maintained flowing against such zone for a period of about three minutes. The tin plating aqueous solution is maintained in the heated condition of 130°–150° F. The solution should not be allowed to drop below 120° F under any conditions since the plating rate of tin ceases at this temperature level. Also at temperatures higher than 160° F, the tin plating compound tends to break down chemically.

The rate at which tin is deposited for the rate at which the tin thickness builds up is shown roughly in FIG. 4. It will be seen that after about 10 seconds, the peak rate is achieved even though the ultimate thickness has not yet been obtained. It has been determined by experiment, that tin deposition by a directed stream provides a 10% faster deposition thickness as compared to tin immersion characteristic of the prior art.

An automotive procedure for carrying out this directive stream approach is shown in FIG. 1 wherein an intermittent conveyor indexing mechanism 30 is employed and is operated in conjunction with a controlled stream flow through nozzle 24. The stream flow is automatically turned off during the indexing or transfer cycle of the conveying system. The heated solution is drawn from a heated reservoir 20 and conveyed to a fluid header 32. A plurality of nozzles 24 are connected to the header and have valves to control intermittent flow. Fluid is directed against the selected zone of each piston when the zonal surface is properly positioned. Fluid leaving the piston is collected in a pan 33 and returned to the reservoir. Mashing 35 may be employed to insure that only the desired zone is contacted by the plating solution.

To promote laminar flow across the desired zone 11a, a spread type nozzle may be employed which has a narrow slot as an outlet orifice.

The product resulting from practicing the above method will have a tin coating of considerable strength and adhesion; the coating will require only 80% of the tin composition required according to total immersion methods. In addition, certain of the sequences of a total immersion method is obviated. A typical total immersion method would comprise (a) spray washing utilizing an alkaline cleaner maintained at a temperature of 120°–160° F, (b) a spray rinse, also maintained at a temperature of 120°–160° F, (c) a cold rinse, (d) a second cold rinse, (e) tin plating by total immersion in an aqueous solution containing 3.2–6.4 ozs. per gallon of potassium stannate maintained at a temperature between 120°–140° F, (f) immersion in a mix tank containing 1.0 lbs. per gallon of potassium stannate maintained at ambient temperature conditions, (g) a spray rinse at ambient temperature conditions, (h) a second spray rinse at a temperature of 120°–140° F, (i) drying off within an oven maintained at a temperature between 125°–175° F, and (j) subjection to cooling at a temperature maintained consistently at about 70° F.

Tin that will be deposited by the total immersion method for a conventional piston was measured to be about 0.1151 grams, which when multiplied by its density will render a tin plating weight of about 0.000244 lbs. Upon analysis, the amount of tin that is plated upon the skirt areas of the same piston by this invention, was measured to be no greater than 0.0215 grams and when multiplied by its density (0.002205) shows a tin plated weight on the skirt area of 0.000047 lbs. Thus plating the local zone 11a of each of the piston skirts provides more than a 75% of savings in tin plating weight.

We claim:
1. A method of providing an element with operational protection against galling and corrosion at selected zones, comprising:
    a. defining an aluminum piston for use in an internal combustion engine, said piston having skirts connecting side walls of said piston and each skirt having at least one selected zone thereof to be protected, said zone extending from the upper central extremity to the lower central extremity of said skirt, said selected zone for deposition occupying less than 10% of the total exterior surface of said piston,
    b. cleaning said piston zone so as to be free of dirt and organic matter as well as oxides of aluminum, and
    c. directing a stream of an aqueous solution containing a protective metal agent consisting essentially of potassium stannate and characterized by its ability to plate out upon momentary contact with metal substrate, said stream being maintained at a temperature of about 140° F and being directed to contact the central upper extremity of said zone and follow the surface in said zone as a laminar flow along the remainder of the zone to the central lower extremity where flow leaves the surface.

2. The method as in claim 1, in which the angle of incidence of said stream with respect to the surface to be plated is within the range of 5°–40°.

3. The method as in claim 1, in which the rate of deposition resulting from said directed stream contact is in the range of 10–30 millionths of an inch per minute.

4. The method as in claim 1, in which the thickness of said tin plating as deposited by said directed stream is in the range of 35–65 millionths of an inch.

5. A method of providing an aluminum piston for an internal combustion engine with operational protection against galling and corrosion at selected zones, comprising:

a. defining an aluminum piston with a pair of arcuately extending skirts on opposite sides of said piston, each of said skirts having a central zone to be protected extending to the lower extremity of said skirt, b. cleaning at least said selected zone so as to be free of dirt organic matter, and c. directing a stream of an aqueous solution containing a metal coating agent consisting essentially of potassium stannate, said solution being maintained at a temperature in the range of 130°–150° F, said stream being directed to contact the upper extremity of said skirt and follow as a laminar flow along the remainder of the zone to the lower extremity of the skirt where the flow leaves the surface.

\* \* \* \* \*